Jan. 21, 1958  J. E. BELL  2,820,959
PIPELINE SCRAPER-LOCATOR TRANSMITTER
Filed March 5, 1956  3 Sheets-Sheet 1
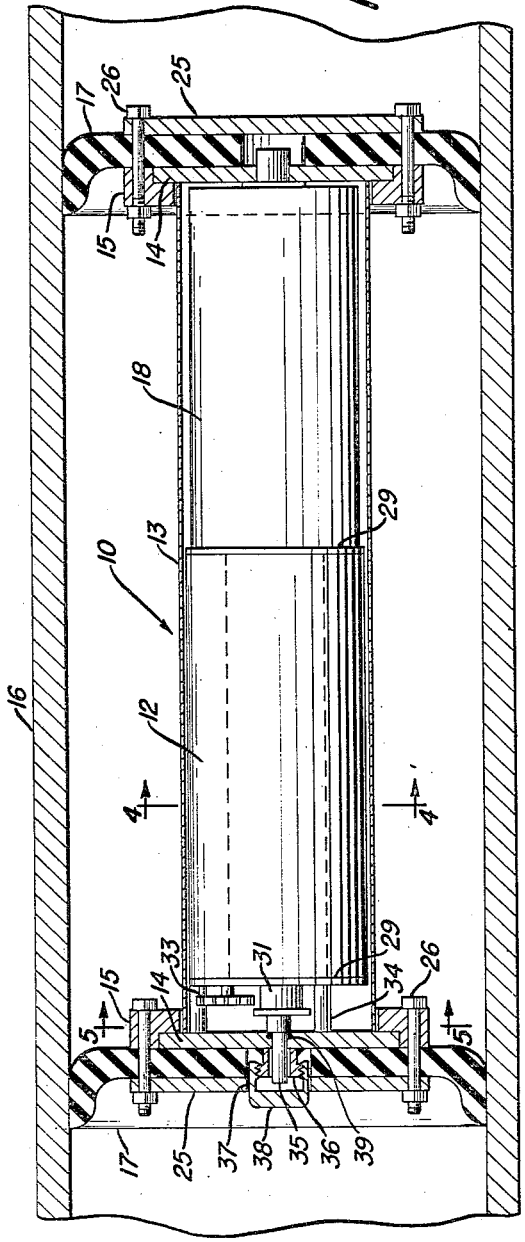
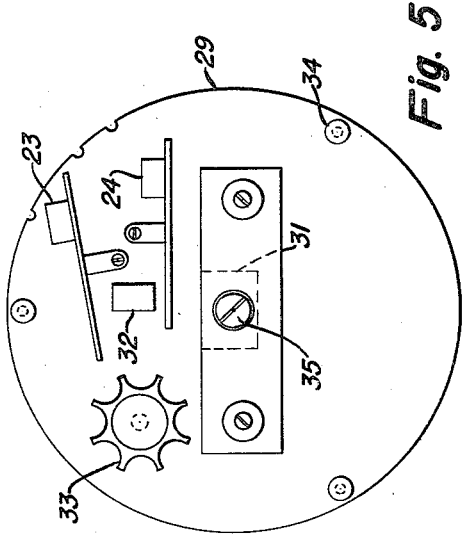
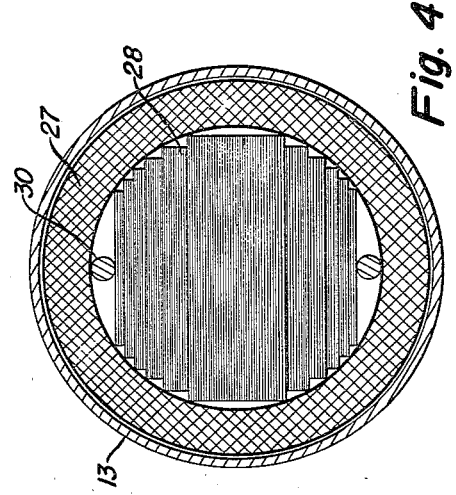
INVENTOR.
James E. Bell
BY
Everett A. Johnson
ATTORNEY

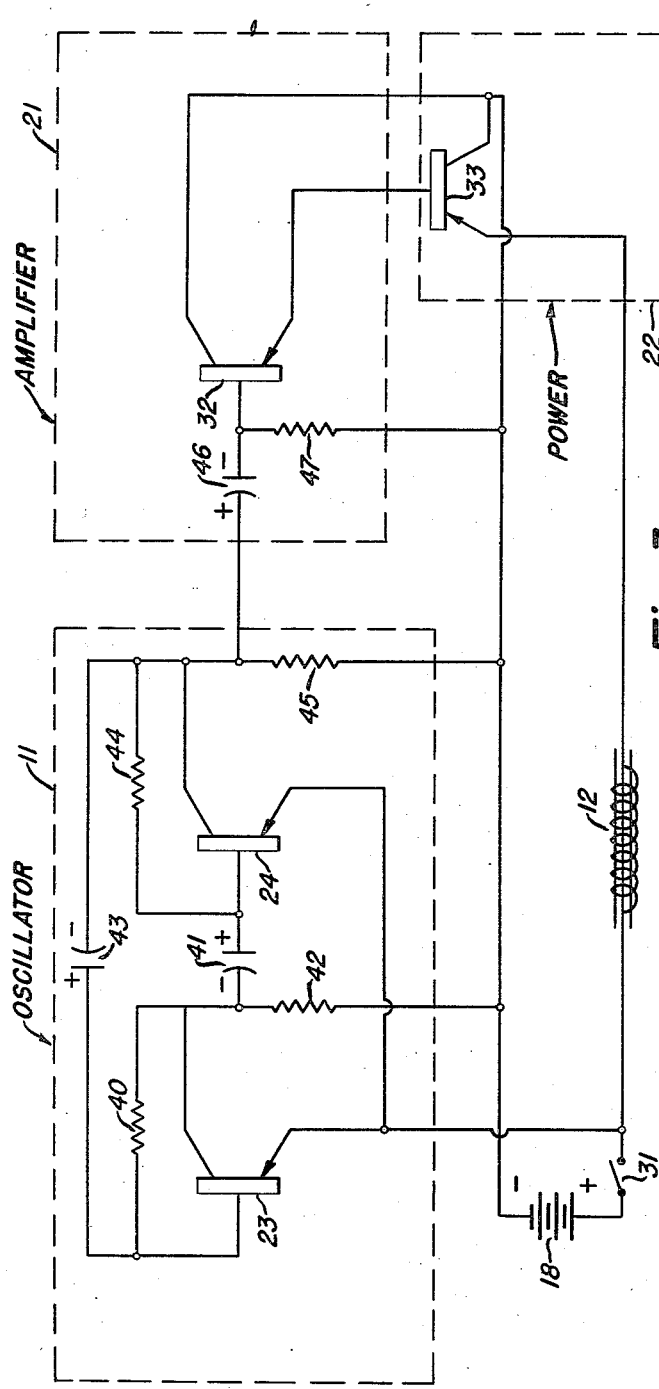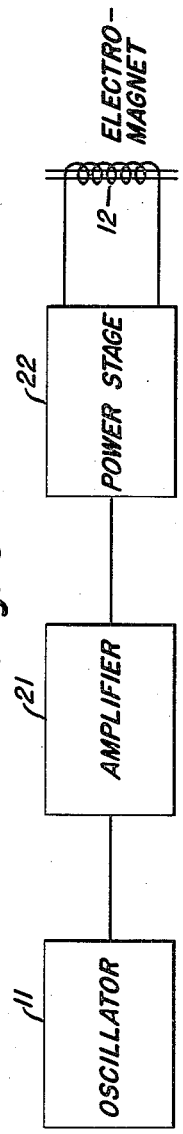
Fig. 3
Fig. 2
INVENTOR.
James E. Bell

Jan. 21, 1958   J. E. BELL   2,820,959
PIPELINE SCRAPER-LOCATOR TRANSMITTER
Filed March 5, 1956   3 Sheets-Sheet 3
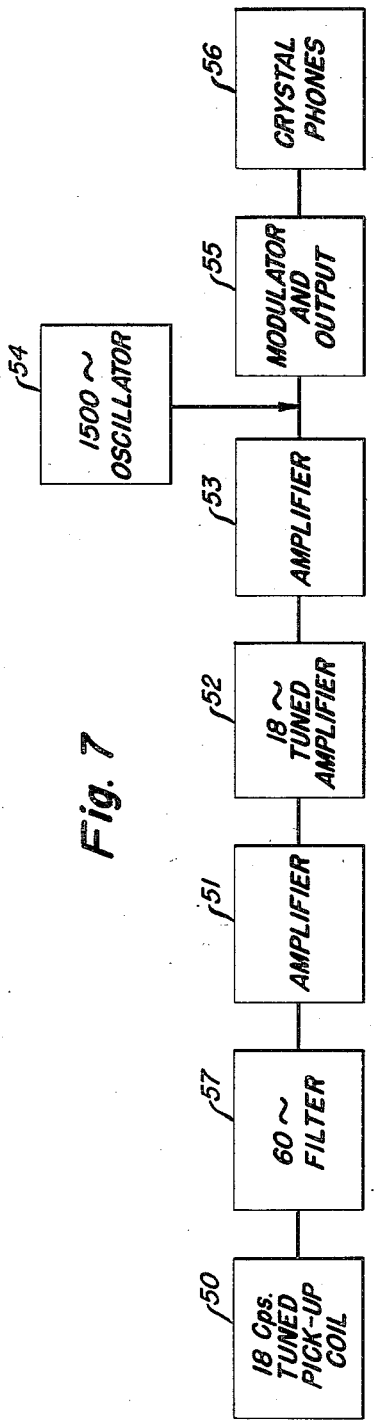
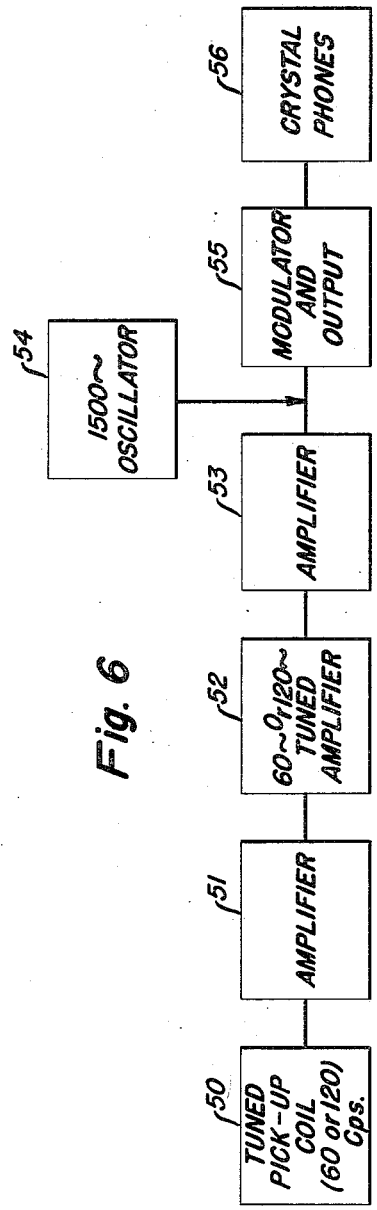
INVENTOR.
James E. Bell
BY Everett A. Johnson
ATTORNEY

United States Patent Office 2,820,959
Patented Jan. 21, 1958

2,820,959

PIPELINE SCRAPER-LOCATOR TRANSMITTER

James E. Bell, Whiting, Ind., assignor to Standard Oil Company, Chicago, Ill., a corporation of Indiana Application March 5, 1956, Serial No. 569,579

6 Claims. (Cl. 340—282)

This invention relates to apparatus for determining the location of cleaning tools in pipelines and refers more particularly to signaling devices for locating or tracing the course of cleaning apparatus in pipelines.

Pipelines frequently become obstructed with sediment, deposited paraffins, and the like and must be kept clean in order to restore normal unobstructed flow of the line. A device commonly employed for such cleaning is a fluid-impelled scraper which is forced through pipelines by the flowing fluid. The operation of such pipeline cleaners is attended by the disadvantage that they occasionally encounter, and are stopped by, obstructions which trap the cleaner. They are then difficult to locate, particularly inasmuch as they are often carried over considerable distances within a line and their rate of travel can only be approximated.

Heretofore, various systems have been proposed for locating the pipe scraper and such systems have included sonic emitters, radar echoing, radioactive sources, and others. However, each of these systems has been limited in its application to pipeline operations and, therefore, none has been generally suitable and foolproof in use.

It is, therefore, a primary object of my invention to provide signal apparatus adapted to be carried by a pipeline scraper whereby the position of the scraper can be located at any time during its travel through a pipeline and at any point within a pipeline. It is a further object of the invention to provide an apparatus which is capable of emitting a signal of such strength and for such duration as to permit a pipeline walker to locate a stuck cleaner. Still another object of the invention is to provide a transmitter for use on pipeline scrapers which is rugged, relatively simple in construction, and foolproof in operation. It is also an object of my invention to provide an apparatus which will give a positive indication of its location when a pipeline is surveyed by an electromagnetic-sensitive receiver. Still another object is to provide an apparatus which will enable one without special skills to search out and locate the trapped pipeline cleaner of the fluid-impelled type. These and other objects of the invention will become apparent as the description of the apparatus is hereinafter given.

I have found that the aforementioned objects can be attained by providing a low frequency electromagnetic wave generator which will give rise to an induced field external of the pipe and will produce a readily identifiable signal over a rather wide area at the surface of the ground. Briefly stated, the present invention comprises an improved source of electromagnetic waves having an electronic driving circuit which permits the use of a suitable receiving apparatus adapted to receive, amplify, and convert the electromagnetic impulse to an audible, visual or recorded signal.

Further details and advantages of my invention will be described in conjunction with a preferred embodiment thereof illustrated in the drawings wherein:

Figure 1 is a simplified elevational view of a pipeline scraper, partly in section, embodying my transmitter;

Figures 2 and 3 are schematic diagrams of the transmitter;

Figure 4 is a section taken along the line 4—4 in Figure 1 showing the construction of the electromagnet utilized in the transmitter;

Figure 5 is a fragmentary enlarged view, with some parts removed, taken along the line 5—5 in Figure 1;

Figure 6 is a block diagram of the receiver apparatus as used to locate the pipe within which the scraper is traveling; and Figure 7 is a block diagram of the receiver apparatus suitable for use in locating the transmitter of Figures 2 and 3.

Briefly, the complete scraper locator comprises a transmitter and a receiver, the transmitter being so designed that it can be carried by a pipe scraper and placed within a pipeline, whereas the receiver can be carried above the ground. The transmitter is located within its own housing to which different sized rubber cups can be adapted and it can be used in several ways. It can be used as batch scraper itself and its movement can be followed either by spot checking as it passes under road beds or it can be followed by walking along and keeping its signal within range which is of the order of about 20 feet. Another procedure is to place it in tandem with another scraper and follow it as described. However, it finds its greatest utility in locating a trapped scraper which has become stuck in the line by allowing the transmitter unit to travel through the pipeline until it reaches the stuck scraper.

A generally acceptable receiver for use in conjunction with my transmitter is described in Brenholdt 2,601,248. However, it is with respect to the transmitter itself that my invention is particularly directed and the construction and operation of the receiver will be described only in general terms.

Referring to the drawings, the transmitter 10 comprises a battery-powered drive unit 11, 21 and 22, driving a laminated-core electromagnet 12. This assembly is mounted with a stainless steel housing 13 provided with end plates 14 which can be secured within retaining rings 15 and used in different sized pipelines 16 by providing appropriately sized rubber cups 17. The transmitter 10 includes a battery 18 which is preferably a large 9-volt supply constructed of mercury cells. The transistor driving unit is a three-stage circuit consisting of an 18-C. P. S. multivibrator 11, a grounded collector amplifier 21 and a grounded collector power output stage 22. Transistors are used because of their low power consumption and small space requirements.

The circuit of Figure 2 employs a low-frequency multivibrator as an oscillator 11 operating at approximately 18 cycles per second for producing the driving power. A large amount of positive feedback is provided to produce oscillation. A small amount of negative feedback is used to present the correct A. C. input impedance for the desired oscillation frequency. This provides the temperature compensation necessary in transistor circuits and allows the use of the correct D. C. bias at the desired A. C. impedance. The signal from the multivibrator 11 is coupled into the high-current-gain grounded collector amplifier 21 which uses the power transistor circuit 22 as its load. The power circuit 22 is also a grounded collector configuration. The use of one transistor 33 as a direct load on the other transistor 32 allows practically all the current drawn from the battery 18 to be utilized in the electromagnet 12 which is the load on the power stage 22.

The transistor driving unit 11, 21 and 22, the electromagnet 12, and the battery 18 are placed within a stainless steel housing 13. Standard rubber cups 17 are mounted at opposite ends of the housing 13 to adapt to any sized pipe from 8 inches to 24 inches in diameter. The housing end discs 14 are held within the clamping rings 15 which are mounted on the rubber cups 17 by means of plates 25 and bolts 26.

The transmitter coil 12 is a single coil consisting of windings 27 around a large single core 28 of laminated iron, as shown in Figure 4, in order to obtain the largest possible magnetic field around the coil 12 for a practical power consumption from the battery 18. Standard high silicon audio transformer iron (0.014 inch thick) cut to different widths but all of the same length comprise the core 28 of the transmitter coil 12. The laminations reduce eddy currents and, therefore, lower the core loss. The strips are then stacked so as to approximate a circular form for the cross-section of the bundle of strips, the strips being well insulated from each other and the entire bundle of strips being insulated from the windings with tape (not shown) to prevent shorting of the wire coil 27 to the core 28. The end plates 29 are held in place by tie rods 30.

Referring to Figure 5, the switch 31 is mounted on the base 29 for connection as shown in Figure 3. Transistors 23, 24 and 32 together with power transistor 33 are supported by the plate 29 and connected in and to the oscillator circuit 11 as shown in Figure 3. A plurality of spacers 34 space the electromagnet 12 within the housing 13 from the end plate 14.

The transmitter 10 should be put into operation just before it is inserted into the pipeline 16. This is done by inserting an appropriate tool in the slot on control shaft 35 on the switch 31 located within the pipe nipple 36 on one end 14 of the housing 13 as shown in Figures 1 and 5. The slotted shaft 35 is turned clockwise about 1/6 revolution until the switch 31 is turned "on," switch 31 being turned "off" by reversing the turning movement.

The bore 37 in the plate 25 and in the rubber cup 17 permits access to the cap 38 and to the switch control shaft 35 through the nipple 36 which is welded to the end plate 14, the shaft 35 being sealed with respect to the end plate 14 by O-ring gasket 39. The pipe cap 38 must be secured on the nipple 36 at all times to protect the switch actuator 35 when the transmitter unit 10 is in the pipeline 16.

The receiver is built to serve a dual purpose of a pipeline locater (Figure 6) or as a scraper-transmitter locator (Figure 7). It detects and audibly indicates the presence of any fluctuating magnetic field with a frequency in the range of about 12 C. P. S. and about 25 C. P. S. Consequently, a certain amount of background noise may be heard in the receiver when it is carried or moved since the receiver core may be cutting the earth's field or other stray magnetic fields at a frequency in the above range of sensitivity.

Pipelines using cathodic protection have full-wave rectified 60 C. P. S. voltage applied to them so that it appears as though there were 120 C. P. S. current in the pipeline. These currents create a magnetic field which can be detected by the receiver. Similarly, a pipeline without cathodic protection normally has a 60 C. P. S. field around it due to currents caused by pickup from power lines, etc. Both of these frequencies can be detected by proper tuning of the receiver.

The receiver circuit shown in block form in Figures 6 and 7 contains a pickup coil 50 which is tuned to the desired frequency, i. e. 18, 60 or 120 cycles. A three-position switch (not shown) on amplifier 52 allows tuning to three separate frequencies of 120 C. P. S. for pipes with cathodic protection, 60 C. P. S. for pipes without cathodic protection, and 18 C. P. S. for detecting the transmitter 10. The signal is fed from the pickup coil 50 into a three-stage tuned amplifier 51, 52, 53, the tuning of which is accomplished in the second stage by negative feedback through a twin T filter of all frequencies except those near the one to which the pickup coil 50 is tuned.

Referring to the block diagrams of the receiver apparatus illustrated in Figures 6 and 7, the pickup coil 50 intercepts an oscillating magnetic field. A major portion of the frequencies incidentally produced by movement in the earth's field of the receiver apparatus, which can be portable and is ordinarily housed in a carrying case, are eliminated by using a tuned amplifier 52 and by the bias on the modulator stage 55. The filter 57 eliminates 60 cycle pickup from power line, railway tracks, etc., when the receiver is being used as a scraper locator. The resultant signal from the pickup coil 50 or from the filter 57 is directed to an amplifier circuit 51, the amplified signal being thereafter directed to an amplifier circuit 52 tuned to the desired frequency and thence to an additional amplifier 53. The signal from 53 serves to gate a 1500 C. P. S. signal produced by the oscillator 54 whereby the 1500 C. P. S. signal is permitted to pass through the modulator and output circuit 55 only at the selected C. P. S. intervals. This audible signal is received by the crystal phones 56.

To operate the receiver in locating a pipeline, the coil 50 is tuned to the desired frequency, i. e. 60 or 120 C. P. S., and then the operator walks back and forth transverse to the expected direction of the buried pipeline 16 and a maximum signal is detected when the receiver crosses the pipe location.

To locate the transmitter, the receiver is tuned to the transmitter frequency of 18 C. P. S. and if the transmitter 10 is within approximately 20 feet of the receiver a very steady tone is heard in the earphones 56 associated with the receiver.

The detected signal is of such a low frequency that it is practically inaudible. Therefore, this signal is used only as a gate to allow the passage of a 1500 cycle signal from oscillator 54 through the last stage 55. The higher frequency is obtained from a neon bulb relaxation oscillator 54 and this 1500 cycle oscillation is impressed upon the output stage 53, but the tube remains in a cut-off condition due to the large negative bias until a signal is coupled to it from the amplifier 55. The tube is then driven out of cut-off and this allows the modulated 1500 cycle signal to be coupled to the high impedance crystal head phones 56.

Although I have described my invention in terms of a preferred embodiment thereof, which is set forth in some detail, it should be understood that this is by way of illustration only and that the invention is not necessarily limited thereto. Alternative embodiments and operating techniques will become apparent to those skilled in the art in view of my disclosure and, accordingly, it is contemplated that modifications can be made in the apparatus without departing from the spirit of the described invention.

What I claim is:

1. A signal transmitter for use in locating a pipeline scraper which comprises a closed housing, a pair of propulsive cups supporting each end of said housing, an electromagnetic wave transmitter mounted within said housing with its axis co-axial with the axis of the pipe, an electronic power drive for said transmitter within said housing, a battery means for energizing said electronic power drive, switch means controlling said drive mounted adjacent one end of said housing, and means operable through one of said propulsive cups for actuating said switch means.

2. A signal transmitter for use in indicating the location of a pipeline scraper within a pipeline which comprises in combination an elongated housing, an electromagnet, an oscillator, an amplifier for the signal from said oscillator, and a power stage for said electromagnet, said oscillator, amplifier, power stage, and electromagnet being housed within said elongated casing with said electromagnet being arranged therein with its axis coaxial with the axis of said elongated casing, and plates on said casing, a pair of propulsive cups removably fixed to said end plates, and switch control means extending through one of said propulsive cups for controlling the said transmitter.

3. An apparatus for transmitting an electromagnetic signal from within a pipeline which comprises in combination a pair of propulsive cups, a casing mounted between said cups, an electromagnet within said casing, a transistor driving circuit for said electromagnet disposed within said casing, and battery means for energizing said circuit, said driving circuit including an oscillator, amplifier, and a power stage, all contained within said casing, and switch means for controlling said transistor driving circuit, said switch means having an actuating element extending exterior of said casing.

4. An apparatus for transmitting an electromagnetic signal from within a pipeline which comprises in combination a pair of propulsive cups, a casing mounted between said cups, an electromagnet, a transistor driving circuit for said electromagnet, said driving circuit including a relaxation type transistor oscillator, amplifier, and a power stage, and battery means for energizing said circuit, all contained within said casing, and switch means having an actuating element extending exterior of said casing and accessible through one of said propulsive cups.

5. A signal transmitter for use in indicating a location within a pipeline which comprises in combination a relaxation type transistor oscillator having transistor circuit components, a transistor circuit amplifier for the signal from said oscillator, an electromagnet, and a power stage for said electromagnet, said oscillator, amplifier, power stage, and electromagnet being housed within an elongated casing, means on said casing carrying a pair of propulsive cups, and switch control means extending through one of said propulsive cups for controlling the said transmitter.

6. A receiver adapted for use with the transmitter of claim 5 which includes a pickup coil tuned to the sine wave frequency of the transmitted signal, a three-stage tuned amplifier, the second stage of which is tuned to the transmitted signal, an oscillator producing a signal of known frequency, the signal from said amplifier serving to gate the signal from said oscillator to a modulator and output circuit, and means for receiving an audible signal identifiable with the signal from the transmitter.

References Cited in the file of this patent

UNITED STATES PATENTS 2,601,249     Brenholdt _____ June 24, 1952